United States Patent
Elliott et al.

(10) Patent No.: US 10,936,493 B2
(45) Date of Patent: Mar. 2, 2021

(54) VOLATILE MEMORY CACHE LINE DIRECTORY TAGS

(71) Applicant: Hewlett Packard Enterprise Development LP, Houston, TX (US)

(72) Inventors: Robert C. Elliott, Houston, TX (US); James A. Fuxa, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/445,830

(22) Filed: Jun. 19, 2019

(65) Prior Publication Data
US 2020/0401521 A1    Dec. 24, 2020

(51) Int. Cl.
*G06F 12/0831* (2016.01)
*G06F 12/0815* (2016.01)

(52) U.S. Cl.
CPC ...... *G06F 12/0815* (2013.01); *G06F 12/0831* (2013.01); *G06F 2212/1021* (2013.01); *G06F 2212/1036* (2013.01); *G06F 2212/225* (2013.01)

(58) Field of Classification Search
CPC ............ G06F 12/0815–0837; G06F 2212/225
See application file for complete search history.

(56) References Cited

U.S. PATENT DOCUMENTS

| | | | |
|---|---|---|---|
| 9,448,798 B1 * | 9/2016 | Bose | G06F 9/30043 |
| 2010/0100685 A1 | 4/2010 | Kurosawa et al. | |
| 2010/0115204 A1 * | 5/2010 | Li | G06F 12/0846 711/130 |
| 2013/0268795 A1 * | 10/2013 | Nomura | G06F 1/3275 713/324 |
| 2014/0297920 A1 * | 10/2014 | Takeda | G06F 15/167 711/102 |
| 2014/0351660 A1 | 11/2014 | Dahlen et al. | |
| 2014/0379975 A1 * | 12/2014 | Ikegami | G11C 14/0081 711/104 |
| 2016/0210251 A1 | 7/2016 | Nale et al. | |
| 2016/0267008 A1 * | 9/2016 | Takeda | G06F 12/0246 |
| 2017/0075811 A1 * | 3/2017 | Hsu | G06F 3/0685 |
| 2017/0212840 A1 * | 7/2017 | Le | G06F 12/0895 |
| 2017/0235522 A1 | 8/2017 | Kim et al. | |
| 2018/0011790 A1 | 1/2018 | Gaur et al. | |

(Continued)

OTHER PUBLICATIONS

Patterson et al. Computer Organization and Design. 2014. Morgan Kaufmann. 5th ed. pp. 372-498 and 540-550. (Year: 2014).*

(Continued)

*Primary Examiner* — Nathan Sadler
(74) *Attorney, Agent, or Firm* — Sheppard Mullin Richter & Hampton LLP (57) ABSTRACT

An example memory system may include a central processing unit (CPU) comprising a CPU cache, a storage class memory, a volatile memory and a memory controller. The memory controller is to store, in the storage class memory, a first cache line including first data and a first directory tag corresponding to the first data. The memory controller is to further store, in the storage class memory, a second cache line including second data and a second directory tag corresponding to the second data. The memory controller is to store, in the volatile memory, a third cache line that comprises the first directory tag and the second directory tag, the third cache line excluding the first data and the second data.

17 Claims, 5 Drawing Sheets

(56) References Cited

U.S. PATENT DOCUMENTS

2019/0108130 A1* 4/2019 Durham .............. G06F 11/1064
2019/0196974 A1* 6/2019 Kalyanasundharam .....................
G06F 12/121

OTHER PUBLICATIONS

Jaehyuk Huh. "Hardware Techniques to Reduce Communication Costs in Multiprocessors." May 2006. http://www.cs.utexas.edu/~cart/publications/dissertations/huh.pdf. pp. 1-13, 82-112.*

IBM Knowledge Center; "Configuring the Near Cache"; printed on Jan. 7, 2019 from: https://www.ibm.com/support/knowledgecenter/en/SSTVLU_8.6.1/com.ibm.websphere.extremescale.doc/txsclinearcacheconfig.html; 4 pages.*

Lloyd, S. et al; "Near Memory KeyValue Lookup Acceleration"; Oct. 2-5, 2017; 8 pages.*

* cited by examiner

VOLATILE MEMORY CACHE LINE DIRECTORY TAGS

BACKGROUND

Memory systems frequently use caches to store more frequently accessed shared memory resources or data. Each client, node or CPU may have an associated local cache. Changes to the data by one CPU may result in incoherent versions of the data amongst the different caches. Cache coherence protocols may be followed to facilitate identification of the current version of the cached data.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed are example memory systems, methods and non-transitory computer-readable mediums that may facilitate faster data access, enhance data retrieval reliability and/or are lower implementation cost. The example memory systems, methods and non-transitory computer-readable mediums utilize a persistent memory, such as a storage class memory (sometimes referred to as "far memory"), to store cached data along with directory tags that indicate ownership of the cached data. The example memory systems, methods and non-transitory computer-readable mediums further utilize a volatile memory, such as dynamic random-access memory (DRAM) (sometimes referred to as "near memory"), to store directory tags corresponding to and indicating ownership of the data stored in the storage class memory. An individual cache line in the volatile memory may include multiple directory tags for multiple cache lines in the persistent memory. Each individual cache line in the volatile memory may omit the data associated with the multiple data tags in the individual cache line.

In some implementations, data transfers in memory system 64 are carried out on a cache line basis, wherein each cache line is 64 bytes. In one implementation, ownership of an associated data cache line may be indicated by a two bit directory tag. In such implementations, a single multi-directory data tag cache line in the volatile memory may comprise up to 256 directory tags corresponding to 256 data cache lines stored in at least the storage class memory. As should be appreciated, depending upon the number of CPUs that may be owners of a data cache line, the number of bits used to indicate which particular CPU of the potential CPU owners owns a particular cache line may be larger such that an individual data cache line may include a fewer number of directory tags identifying ownership for a fewer number of corresponding data cache lines in the storage class memory. In other implementations, the data cache line or data block may have a greater or fewer number of such bits depending upon the particular configuration of the memory system.

With the example memory systems, methods and mediums, the ownership state of data cached in the storage class memory or persistent memory may be determined without the corresponding data also being read. Rather, a single cache line in the volatile memory may indicate the ownership state of multiple cache lines in the persistent memory. Moreover, a change in the ownership state of data cached in the storage class memory or persistent memory may be indicated in the volatile memory without the data having to be written in the volatile memory.

The disclosed memory systems, methods and non-transitory computer-readable mediums may not result in writing to the storage class memory when a particular data cache line has not been altered, despite ownership of the particular data cache line potentially being changed. As a result, the time consumed during the writing to the SCM is reduced and system SCM media wear out is decreased. Because the volatile memory does not store the data cache lines, but may merely store directory tags, the volatile memory may be of a lower capacity or the additional available capacity of the volatile memory may be used for other storage purposes.

Disclosed is an example memory system that may include a central processing unit (CPU) comprising a CPU cache, a storage class memory, a volatile memory and a memory controller. The memory controller is to store, in the storage class memory, a first cache line including first data and a first directory tag corresponding to the first data. The memory controller is to further store, in the storage class memory, a second cache line including second data and a second directory tag corresponding to the second data. The memory controller is to store, in the volatile memory, a third cache line that comprises the first directory tag and the second directory tag, the third cache line excluding the first data and the second data.

Disclosed is an example method that may include reading a data cache line, processing the data with a central processing unit to alter the data to produce altered data and writing, in a volatile memory, a cache line comprising a first directory tag identifying ownership of the data cache line in the storage class memory containing the data without correspondingly writing the altered data in the volatile memory.

Disclosed is an example non-transitory computer-readable medium that contain instructions that direct a processing unit to receive a request, from a central processing unit (CPU), for data stored as part of a first cache line in a storage class memory and read a second cache line in a volatile memory to determine ownership of the first cache line in the storage class memory, the second cache line comprising individual directory tags, wherein each of the individual directory tags identify ownership of a corresponding cache line in the storage class memory. The instructions further direct the processing unit to access the data at one of a cache memory of the CPU, a cache memory of a different CPU or the storage class memory based upon the determined ownership of the first cache line.

Figure 1:
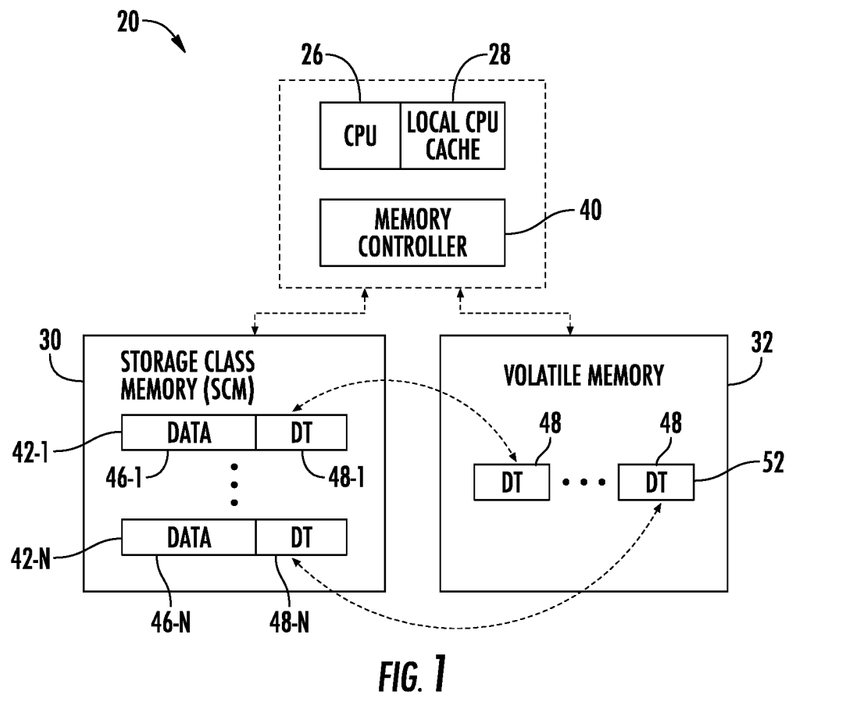
FIG. 1 is a diagram schematically illustrating portions of an example memory system.

FIG. 1 illustrates portions of an example memory system 20 for carrying out an example cache data access and coherency method. Memory system 20 may facilitate faster data access, enhance data retrieval reliability and/or lower implementation cost. Memory system 20 comprises central processing unit (CPU) 26 with its associated local CPU cache 28, storage class memory 30, volatile memory 32 and memory controller 40.

CPU 26, also sometimes referred to as a client or node, accesses data stored in the memory system 20. Such "access" may include reading the data or altering the data by adding to the data or overwriting the data. CPU 26 accesses cached data through the associated memory controller 40.

Storage class memory (SCM) 30, also referred to as persistent memory, comprises a persistent storage device or non-volatile memory that represents a hybrid approach between volatile memory, such as DRAM, and nonvolatile memory or storage such as flash memory. SCM 30 comprises persistent memory that achieves cached data access/performance speeds nearly as fast as volatile memory such as DRAM while also storing the data in a non-volatile fashion, persisting data during power cycles. In one implementation, in contrast to flash memory, SCM 30 provides higher data access/performance speeds through its ability to have its files overwritten. Cached data is data that is more frequently accessed, wherein storage class memory 30 provides faster access as compared to accessing the data through a main memory. One example of SCM may be a form of resistive random-access memory (RAM). In other implementations, SCM includes, but is not limited to, phase change memory and memristor memory.

Volatile memory 32, comprises memory that maintains its data while the associated devices being powered. One example of volatile memory is dynamic random-access memory (DRAM).

Memory controller 40 comprises a processing unit and associated non-transitory computer-readable medium that contain instructions to direct the processing unit to carry out various memory operations. Memory controller 40 may transfer data between a random-access memory of CPU 26 and one of various caches associated with CPU 26. In one implementation, memory controller 40 may comprise a North Bridge chipset on a motherboard. In other implementations, memory controller 40 may come be part of or inside of CPU 26 itself.

Following such instructions, memory controller 40 stores data cache lines 42-1 to 42-N (collectively referred to as data cache lines 42) in SCM 30. Data cache lines 42-1 to 42-N comprise data portions 46-1 to 46-N (collectively referred to as data portions 46) and directory tags 48-1 to 48-N (collectively referred to as directory tags 48), respectively. Each of data portions 46 includes the data that is cached for use by CPU 26 and that may also be stored in the main memory. Each of directory tags 48 indicates an ownership status of the associated particular data portion 46. In one implementation, each directory tag 48 indicates which particular CPU 26 currently has "ownership" of the associated data portion 46. "Ownership" of data or a data cache line refers to which particular CPU (its local CPU cache) has the most recent or up-to-date version of the data or of the cache line. For example, a cache line may be accessed from SCM 30. The particular CPU that most recently accessed the cache line is the "owner" of the cache line.

Figure 2:
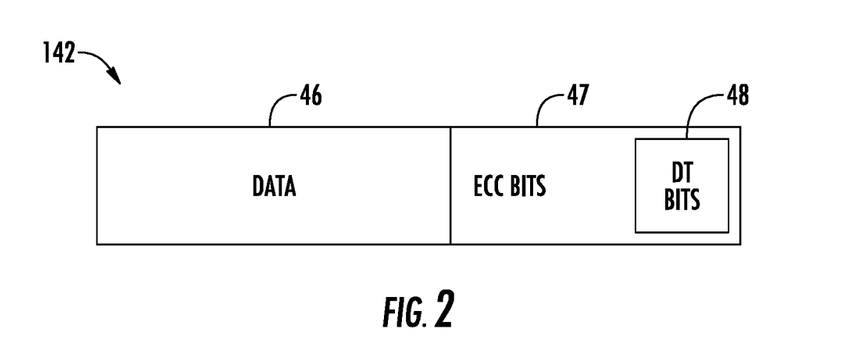
FIG. 2 is a diagram illustrating an example data cache line.

FIG. 2 is a diagram illustrating data cache line 142, an example of a data cache line 42 that may be stored in SCM 30. In the example illustrated, data cache line 142 comprises data portion 46 and error correction code (ECC) bits 47. A portion of the ECC bits 47 are not utilized for error correction code purposes, but are instead utilized for storing a directory tag 48. In other implementations, data cache lines 42 may utilize other formats for associating a directory tag 48 with the corresponding data portion 46.

As further shown by FIG. 1, the instructions also direct memory controller 42 store multi-directory tag cache line (MDTCL) 52 in volatile memory 32. The MDTCL 52 comprises multiple directory tags 48 corresponding to the directory tags 48 stored in SCM 30 for data portions 46 in data cache lines 42. In one implementation, MDTCL 52 omits the data portions 46 that are associated with the particular directory tags 48 in MDTCL 52. Said another way, the instructions direct controller 40 to store, in the storage class memory 30, a first cache line 42 including first data 46 and a first directory tag 48 corresponding to the first data. The memory controller 42 is to further store, in the storage class memory 30, a second cache line 42 including second data 46 and a second directory tag 48 corresponding to the second data 46. The memory controller 40 is to further store, in the volatile memory 32, a third cache line 52 that comprises the first directory tag 48 and the second directory tag 48, wherein the third cache 52 line excludes the first data 46 and the second data 46. In one implementation, MDTCL 52 consists of a series or string of different directory tags 48 for the cache lines 42 in SCM 30.

In some implementations, data transfers in memory system 20 are carried out on a cache line basis, wherein each cache line is 64 bytes. In one implementation, ownership of an associated data cache line may be indicated by a two bit directory tag 48. In such implementations, a single multi-directory data tag cache line 52 in the volatile memory 32 may comprise up to 256 directory tags 48 corresponding to 256 data cache lines 42 stored in at least the storage class memory 30. As should be appreciated, depending upon the number of CPUs that may be owners of a data cache line, the number of bits used to indicate which particular CPU of the potential CPU owners owns a particular cache line may be larger such that an individual data cache line may include a fewer number of directory tags identifying ownership for a fewer number of corresponding data cache lines in the storage class memory. In other implementations, the data cache line or data block may have a greater or fewer number of such bits depending upon the particular configuration of the memory system.

In the illustrated example memory system 20, changes in ownership of the data cache line are reflected by a new MDTCL 52 in volatile memory 32, wherein the new MDTCL 52 includes an altered directory tag 48 for the data cache line 42 whose ownership has changed. If the data of a particular data cache line 42 has not been altered, such as a read of the data of the cache line 42, updating of the corresponding data tag 48 in SCM 30 may be omitted. In other words, every single access to a particular data cache line 42 does not result in a corresponding write to SCM 30. As a result, system 20 may decrease SCM media wear out and reduce memory channel traffic.

System 20 further provides enhanced system performance. For a CPU 26 to determine ownership of a particular targeted data cache line, CPU 26 may read the MDTCL 52 in volatile memory 32. Such a reading operation is often much faster than reading a data tag from SCM 30, which would also involve reading the associated data portion 46. In addition, in circumstances where the data of the data cache line is not altered, but ownership has changed, writing or overwriting a new MDTCL 52 to volatile memory 32 may also be much faster as compared to writing the unaltered or same data cache line along with a different data tag to SCM 30.

In implementations where volatile memory 32 does not store data portions 46 of data cache lines 42, but instead stores just the corresponding data tags 48, space in volatile memory 32 is not consumed by the storage of such data portions. As a result, volatile memory 32 may be smaller or be satisfied with a lower capacity volatile memory. In some implementations, volatile memory 32 may utilize the excess capacity for other purposes.

Figure 3:
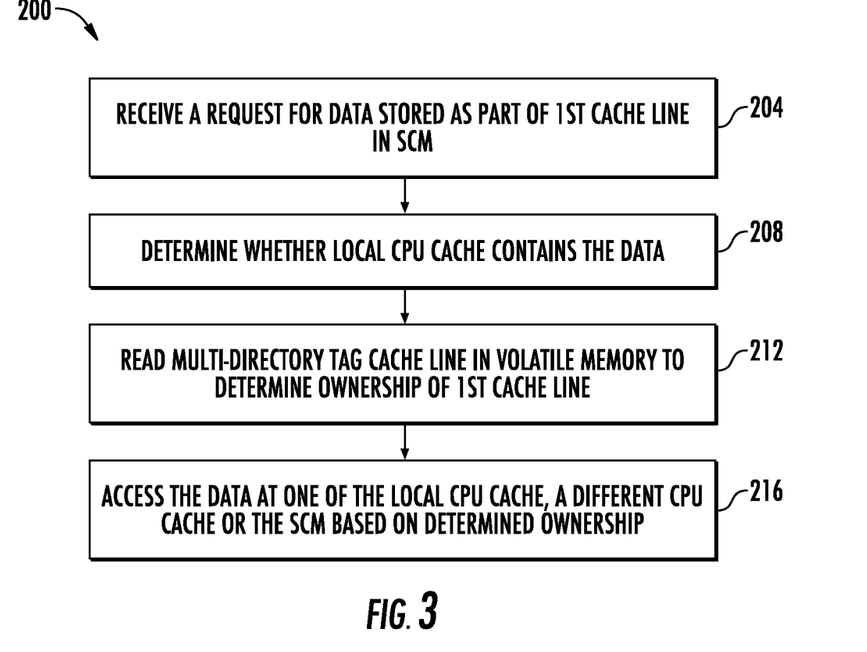
FIG. 3 is a flow diagram of an example data cache method.

FIG. 3 is a flow diagram of portions of an example data accessing method 200. Method 200 facilitates the accessing of data in a data cache line in a timely fashion with a potentially lower implementation cost. Method 200 may be part of a larger overall protocol or process for the retrieval of data and maintenance of coherence amongst different cache storage devices. Although method 200 is described in the context of being carried out by memory system 20 described above, it should be appreciated that method 200 may likewise be carried out with any of the memory system described hereafter or with other similar memory systems.

As indicated by block 204, memory controller 40 may receive a request for particular data stored as part of the first cache line in SCM 30. The data being requested may also be stored at other locations in addition to SCM 30, such as in the local CPU cache 28 or in the CPU cache 28 of another CPU 26.

As indicated by block 208, memory controller 40 determines whether the local CPU cache 28 contains the data or first cache line of the request. As indicated by block 212, memory controller 40 further consults volatile memory 32 to determine ownership of the first cache line. In particular, memory controller 40 reads multi-directory tag cache line 52 which includes a data tag 48 corresponding to the first data cache line being requested in block 204.

As indicated by block 216, based upon the determined ownership identified by the directory tag 48, memory controller 40 accesses the requested data at one of the local CPU cache 28, eight different CPU cache, a cache 28 of a different CPU 26, or an SCM, such as SCM 30. The table below illustrates various possible results for blocks 208 and 212 and the resulting response, accessing of data per block 216. In the table below, a "hit" refers to a determination in block 208 that the local CPU cache 28 contains the data of the first cache line. A "miss" refers to a determination block 208 that the local CPU cache 28 does not contain the data of the first cache line. As indicated below, various responses may also depend upon whether the volatile memory 32 contains any directory tag 48 corresponding to the data or data cache line being requested.

| LOCAL CPU CACHE LOOKUP | VOLATILE MEMORY MDTCL LOOKUP | RESPONSE |
| --- | --- | --- |
| hit | CPU owns cache line | Use data from CPU cache |
| hit | Other CPU owns cache line | Snoop other CPU caches for latest data |
| hit | DT not in volatile memory | Access local SCM for DT and possibly data |
| miss | CPU owns cache line | access data from SCM |
| miss | Other CPU owns cache line | Snoop other CPU caches for latest data |
| miss | DT not in volatile memory | Access local SCM for DT and possibly data |

Figure 4:
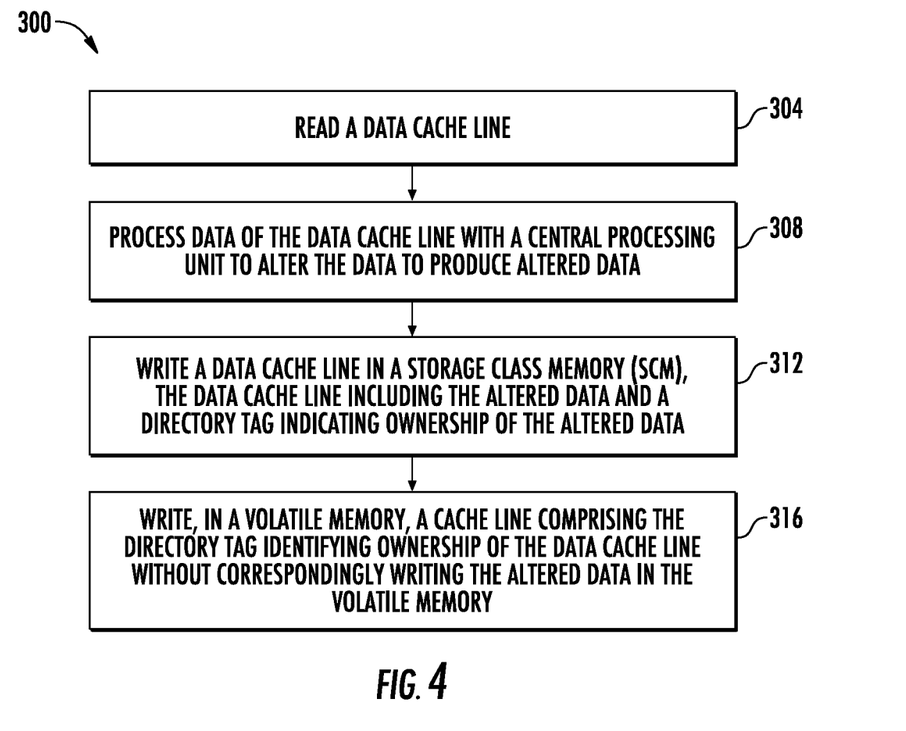
FIG. 4 is a flow diagram of an example data cache method.

FIG. 4 is a flow diagram of portions of an example data cache method 300. Method 300 facilitates the accessing of data in a data cache line in a timely fashion with a potentially lower implementation cost. Method 300 may be part of a larger overall protocol or process for the retrieval of data and maintenance of coherence amongst different cache storage devices. For example, method 300 may be combined with method 200 described above, wherein the blocks of method 300 are carried out pursuant to block 216 of method 200. Although method 300 is described in the context of being carried out by memory system 20 described above, it should be appreciated that method 200 may likewise be carried out with any of the memory system described hereafter or with other similar memory systems.

As indicated by block 304, memory controller 40 accesses a data cache line by reading the data cache line. The cache line may be read from the local CPU 28 associated with the CPU 26 and the associate memory controller 40, may be read from the SCM 30 associated with the CPU 26 associated with the memory controller 40 or may be read from (snooped from) the CPU cache 28 of a different CPU 26.

As indicated by block 308, the data on the cache line is processed by the CPU 26, wherein such processing results in the data being altered to produce altered data. For example, the data of the data cache line may be overwritten, where additional data is added to the data cache line, data is subtracted from the data cache line or existing data of the data cache line is changed.

As indicated by block 312, memory controller 40 writes the data cache line in an SCM, such as SCM 30, wherein the data cache line includes the altered data and a directory tag indicating ownership of the altered data. As indicated by block 316, the memory controller 40 further writes, in volatile memory 32, a cache line comprising the directory tag identifying ownership of the data cache line (the line that was written in block 312) without correspondingly writing the altered data (the data written as part of the data cache line in block 312) in volatile memory 32. In one implementation, the cache line may comprise the directory tag as well as other directory tags indicating ownership of other data cache lines stored in SCM 30.

Figure 5:
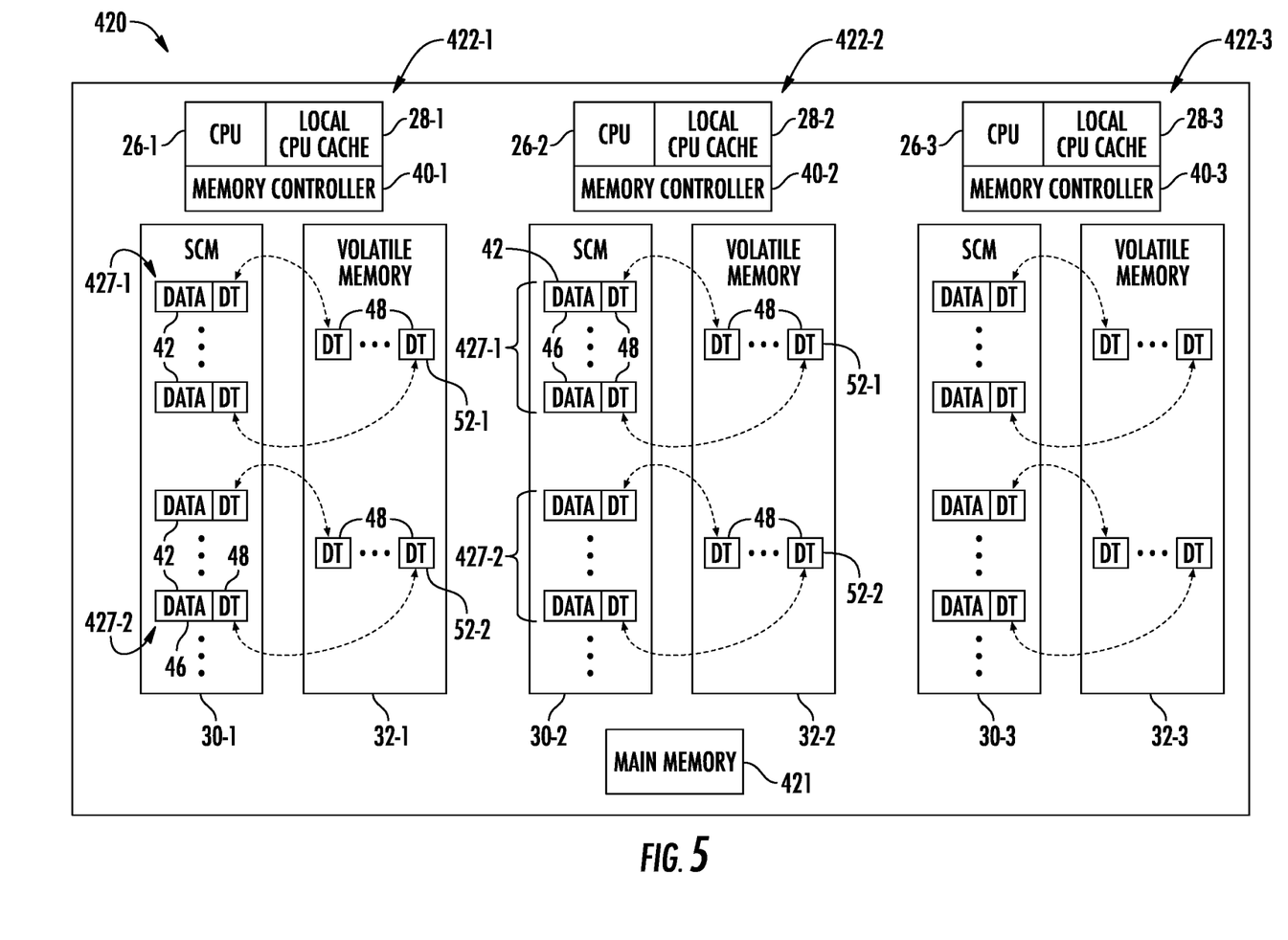
FIG. 5 is a diagram schematically illustrating portions of an example memory system.

FIG. 5 is a diagram schematically illustrating portions of an example memory system 420. Memory system 420 is similar to memory system 20 described above except that memory system 420 is specifically illustrated as comprising at least three CPUs and their associated local CPU caches, memory controllers, SCMs and volatile memories. In the example illustrated, memory system 420 comprises a main memory 421 and CPU sites 422-1, 422-2 and 422-3 (collectively referred to as CPU sites 422). Main memory 421 comprises at least one persistent or nonvolatile memory storage device storing data for use by the different CPUs associated with different CPU sites 422. In one implementation, main memory 421 may comprise a solid-state drive (SSD) or a hard disk drive (HDD).

CPU sites 422-1, 422-2 and 422-3 may be similar in composition. Each of CPU sites 422 comprises a CPU and its associated cache, a memory controller, a storage class memory and a volatile memory. CPU sites 422 may be connected by a bus. In the example illustrated, CPU sites 422-1, 422-2 and 422-3 comprise CPUs 26-1, 26-2, 26-3 (collectively referred to as CPUs 26), the associated local CPU caches 28-1, 28-2, 28-3 (collectively referred to as CPU caches 28), storage class memories 30-1, 30-2, 30-3 (collectively referred to as storage class memories 30), volatile memories 32-1, 32-2, 32-3 (collectively referred to as volatile memories 32) and memory controllers 40-1, 40-2 and 40-3 (collectively referred to as memory controllers 40), respectively. Each of CPUs 26, CPU caches 28, storage class memories 30, volatile memory 32 and memory controllers 40 may be similar to CPU 26, CPU cache 28, storage class memory 30, volatile memory 32 and memory controller 40 described above.

In one implementation, CPU cache 28 may comprise multiple cache levels. In the example illustrated, each of SCMs is preassigned or dedicated to a set or portion of total available storage space or cache addresses. For example, the total amount of cache storage space collectively among the different SCMs 30 may correspond to the total memory space of main memory 421. The total memory space of main memory 421 may be subdivided into different portions which are assigned to the different SCMs 30 at the different CPU sites 422. In one implementation, each SCM 30 may store or cache data that is most frequently accessed by the associated CPU. For example, SCM 30-1 may cache those data cache lines that are most frequently accessed by CPU 26-1 as compared to the other CPUs 26-2 and 26-3. SCM 30-2 may cache those data cache lines that are most frequently accessed by CPU 26-2 as compared to the other CPUs. SCM 30-3 may cache those data cache lines that are most frequently accessed by CPU 26-3 as compared to the other CPUs.

As with storage class memory 30 of system 20, each of storage class memories 30 of system 420 stores data cache lines 42. Data cache lines 42 comprise data portions 46 and directory tags 48 described above. FIG. 5 illustrate each of SCM's 30 as storing at least two sets 427-1 and 427-2 (collectively referred to as sets 427) of data cache lines 42. Each of sets 427 may have a corresponding MDTCL 52 starting volatile memory 32-1. In the example illustrated, the directory tags 48 corresponding to the data cache lines 42 of set 427-1 are stored as a MDTCL 52-1 in the respective volatile memory 32. The directory tags corresponding to the data cache lines 42 of sets 427-2 are stored together as a MDTCL 52-2. In one implementation, MDTCL 52 omits the data portions 46 that are associated with the particular directory tags 48 in MDTCL 52. In one implementation, MDTCL 52 consists of a series or string of different directory tags 48 for the cache lines 42 in the SCM 30 of the same CPU site 422.

Figure 6:
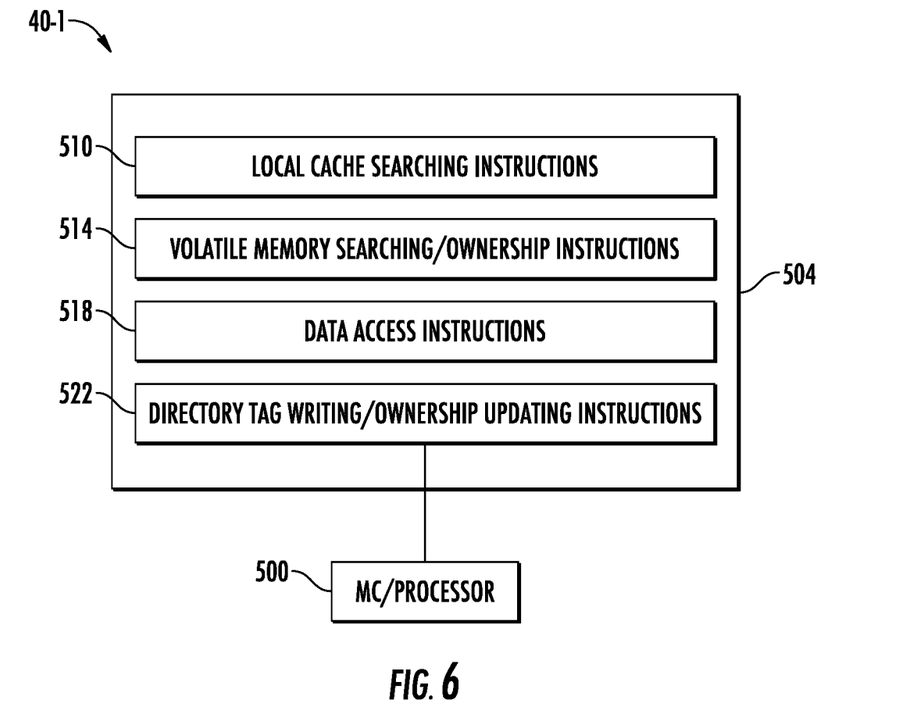
FIG. 6 is a diagram schematically illustrating portions of an example memory controller.

Memory controllers 40 is similar to memory controller 40 described above with respect to memory system 20. Each of memory controllers 40 accesses cached data stored in either a particular SCM 30 or stored in a CPU cache 28. FIG. 6 is a diagram schematically illustrating portions of an example memory controller 40-1. Memory controller 40-2 and 40-3 may have similar designs. Memory controller 40-1 comprises processor 500 and a non-transitory computer-readable medium 504. Medium 504 contains instructions for directing a processor 500. In the example illustrated, medium 504 comprises local cache searching instructions 510, volatile memory searching/ownership instructions 514, data access instructions 518 and directory tag writing/ownership updating instructions 522. Such instructions direct processor 500 to carry out the example method 600 shown in FIG. 7.

Figure 7:
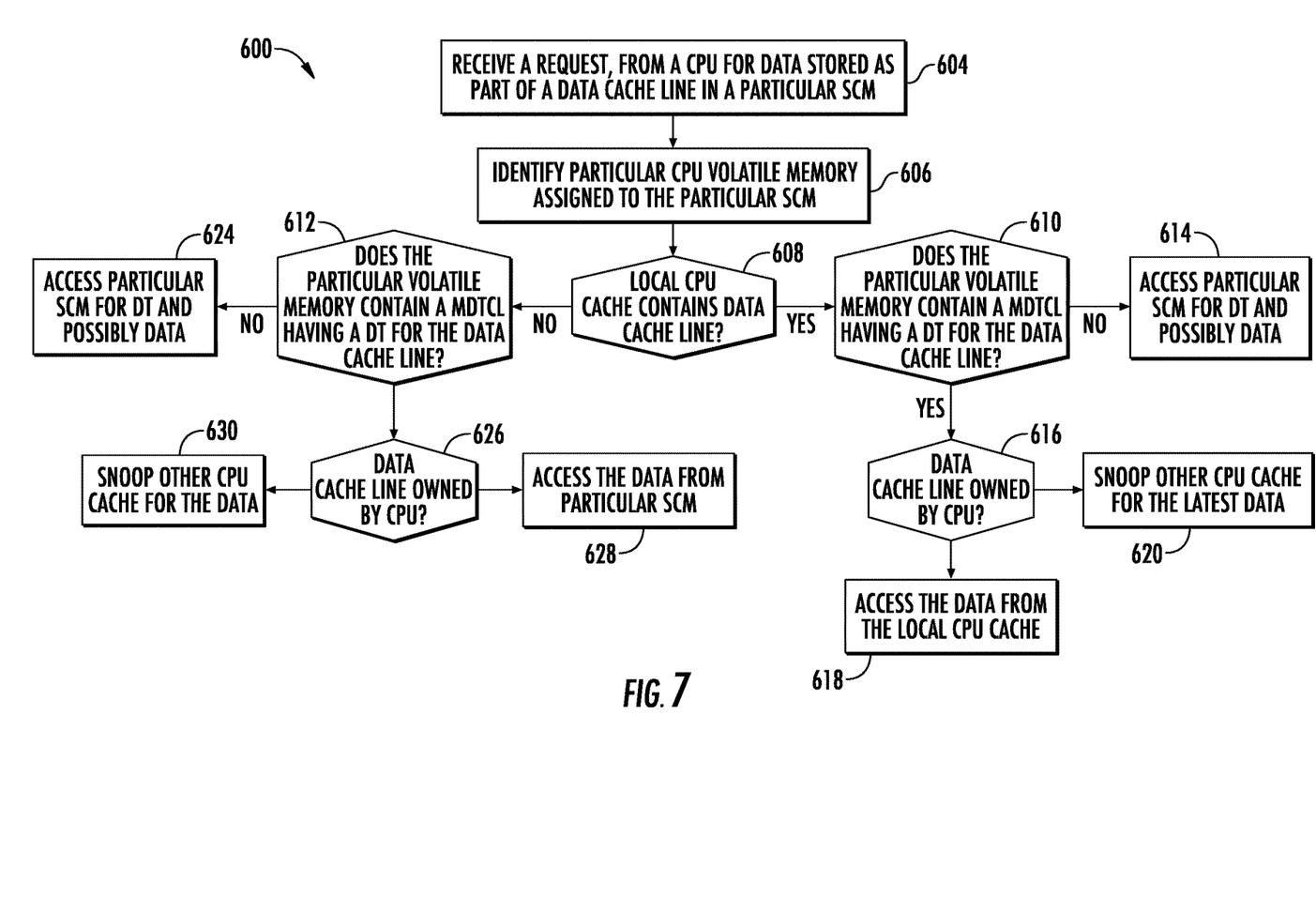
FIG. 7 is a flow diagram of an example data cache method.

FIG. 7 is a flow diagram illustrating portions of an example data cache method 600. Method 600 may facilitate faster data access, enhance data retrieval reliability and/or lower implementation cost. Although method 600 is described in the context of being carried out by memory system 420 with memory controllers as described with respect to FIG. 6, in other implementations, method 600 may be carried out with other memory systems and other memory controllers.

As indicated by block 604, memory controller 40-1 may receive a request from CPU 26-1 for data stored as part of a data cache line in a particular SCM 30-1, 30-2, 30-3. As indicated by block 606, memory controller identifies the individual or particular CPU volatile memory 32-1, 32-2 or 32-3 assigned to the particular SCM that is assigned or designated for the storage of the data cache line. For example, SCM 30-1 and its associated volatile memory 32-1 may be preassigned for the storage of cache addresses 1 to x, SCM 30-2 and associated volatile memory 32-2 may be preassigned for the storage of cache addresses x+1 to y, and SCM 30-3 may be preassigned for the storage of cache addresses y+1 to z. Upon receiving a request for data stored as part of a particular data cache line, memory controller 40-1 may determine in what range of cache addresses or cache data lines assigned to each of SCMs 30 the particular data cache line of the requested lies. This determination controls which of the volatile memories 32 will be searched by memory controller 40-1 for a directory tag corresponding to the data cache line and indicating current ownership of the data cache line. The same determination process applies to circumstances where CPU 26-2 or CPU 26-3 is requesting a particular data cache line.

As indicated by block 608, local cache searching instructions 510 direct processor 500 of memory controller 40-1 to search the local CPU cache 28-1 of CPU 26-1 (the requester) to determine whether the local CPU cache 28-1 contains the data cache line having the requested data. As indicated by blocks 610 and 612, volatile memory searching/ownership instructions 514 direct the processor 500 to also determine whether the particular CPU volatile memory identified in block 606 contains a MDTCL 52 having a directory tag (DT) for the data cache line.

As indicated by block 614, in response to the local CPU cache 28-1 (the local CPU cache of the requesting CPU 26-1) containing the data cache line associated with the requested data as determined in block 608 and in response to the particular volatile memory identified in block 606 not containing a MDTCL 52 having a directory tag 28 for the requested data cache line, data access instructions 518 direct processor 500 to access the particular SCM identified in block 606 for the directory tag 28 corresponding to the data cache line and possibly the requested data, depending upon the ownership of the data as indicated by the directory tag 28 in the particular SCM 30.

As indicated by block 616, in response to the local CPU cache 28-1 containing the data cache line associated with the requested data as determined in block 608 and in response to the particular volatile memory identified in block 606 containing a MDTCL 52 having a directory tag 28 for the requested data cache line, data access instructions 518 direct processor 500 to determine from the directory tag the current owner for the requested data cache line. As indicated by block 618, in response to the directory tag read in the MDTCL 52 of the particular volatile memory indicating that the requested data cache line is owned by the requesting CPU (CPU 26-1 in the example being described), data access instructions 518 direct processor 500 to access the data from the local CPU cache (CPU cache 28-1 of the requesting CPU 26-1).

Alternatively, as indicated by block 620, if the directory tag read from the particular volatile memory identified in block 606 indicates a different or other CPU cache as being the owner of the data cache line, data access instructions 518 direct processor 500 to snoop the identified other CPU cache for the latest data. For example, in one scenario, the data cache line containing the requested data may be assigned to CPU site 422-2. As such, memory controller 40-1 associated with CPU 26-1 (the requesting CPU) would consult or read volatile memory 32-2 of CPU site 422-2 in an attempt to identify a directory tag indicating ownership of the requested data cache line. If the directory tag is found in volatile memory 32-2, but indicates that local CPU cache 28-3 is the owner of the data cache line (not the local CPU cache 28-1 of the requesting CPU 26-1), data access instructions 518 would direct processor 500 of memory controller 40-1 to snoop the CPU cache 20-3 for the latest or most up to date version of the requested CPU cache line.

As indicated by block 624, in response to the local CPU cache 28-1 (the local CPU cache of the requesting CPU 26-1) not containing the data cache line associated with the requested data as determined in block 608 and in response to the particular volatile memory identified in block 606 not containing a MDTCL 52 having a directory tag 28 for the requested data cache line per block 612, data access instructions 518 direct processor 500 to access the particular SCM identified in block 606 for the directory tag 28 corresponding to the data cache line and possibly the requested data, depending upon the ownership of the data as indicated by the directory tag 28 in the particular SCM 30.

As indicated by block 626, in response to the local CPU cache 28-1 not containing the data cache line associated with the requested data as determined in block 608 and in response to the particular volatile memory identified in block 606 containing a MDTCL 52 having a directory tag 28 for the requested data cache line per block 612, data access instructions 518 direct processor 500 to determine from the directory tag the current owner for the requested data cache line. As indicated by block 628, in response to the directory tag read in the MDTCL 52 of the particular volatile memory indicating that the requested data cache line is owned by the requesting CPU (CPU 26-1 in the example being described), data access instructions 518 direct processor 500 to access the data from the particular SCM 30-1 associated with the requesting CPU 26-1 (being at the same CPU site 422-1).

Alternatively, as indicated by block 630, if the directory tag read from the particular volatile memory identified in block 606 indicates a different or other CPU cache as being the owner of the data cache line, data access instructions 518 direct processor 500 to snoop the identified other CPU cache for the latest data. For example, in one scenario, the data cache line containing the requested data may be assigned to CPU site 422-2. As such, memory controller 40-1 associated with CPU 26-1 (the requesting CPU) would consult or read volatile memory 32-2 of CPU sites 422-2 in an attempt to identify a directory tag indicating ownership of the requested data cache line. If the directory tag is found in volatile memory 32-2, but indicates that local CPU cache 28-3 is the owner of the data cache line (not the local CPU cache 28-1 of the requesting CPU 26-1), data access instructions 518 would direct processor 500 of memory controller 40-1 to snoop the CPU cache 20-3 for the latest or most up to date version of the requested CPU cache line.

Once the location of the most up to date our latest version of the data cache line containing the requested data has been found, either in the local CPU cache of the requesting CPU, one of the SCMs 30 or in a CPU cache 28-1, 28-2 or 28-3 of another non-requesting CPU, the data may be accessed. Such access may be carried out according to method 300 described above with respect to FIG. 4. In particular, directory tag writing such ownership updating instructions 522 direct processor 500 to carry out method 300 when the data cache line being read is process so as to produce altered data.

Although the present disclosure has been described with reference to example implementations, workers skilled in the art will recognize that changes may be made in form and detail without departing from the spirit and scope of the claimed subject matter. For example, although different example implementations may have been described as including features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A non-transitory computer-readable medium containing instructions to direct a first central processing unit (CPU) to:
   receive a request, from a second CPU, for data stored as part of a data cache line in a storage class memory;
   read a cache line containing multiple directory tags in a volatile memory to determine ownership of the data in the storage class memory, each of the multiple directory tags identifying ownership of a corresponding data cache line in the storage class memory;
   determine whether a CPU cache of the first CPU contains the data;
   search the volatile memory for a directory tag corresponding to the data, the third directory tag indicating the ownership of the data; and
   in response to the CPU cache containing the data and the directory tag indicating ownership of the data by a third CPU different from the first CPU, snoop the third CPU to obtain the data.

2. The medium of claim 1, wherein the cache line omits the data.

3. The medium of claim 1, wherein the instructions are to further direct the first CPU to:
   in response to the CPU cache containing the data and the directory tag corresponding to the data indicating the ownership of the data by the CPU, use the data from the CPU cache;
   in response to the CPU cache containing the data and the volatile memory omitting the directory tag corresponding to the data, access the data from the storage class memory;
   in response to the CPU cache not containing the data and the directory tag indicating the ownership of the data by a different CPU, snoop the different CPU to obtain the data; and
   in response to the CPU cache not containing the data and the volatile memory omitting the directory tag corresponding to the data, access the data from the storage class memory.

4. A memory system comprising:
   a central processing unit (CPU) comprising a CPU cache;
   a storage class memory;
   a volatile memory; and
   a memory controller to:
      store, in the storage class memory, a first cache line including first data and a first directory tag corresponding to the first data;

store, in the storage class memory, a second cache line including second data and a second directory tag corresponding to the second data;
store, in the volatile memory, a third cache line that comprises the first directory tag and the second directory tag, the third cache line excluding the first data and the second data;
receive a request for third data;
determine whether the CPU cache of the CPU contains the third data;
search the volatile memory for a third directory tag corresponding to the third data, the third directory tag indicating ownership of the third data; and
in response to the CPU cache containing the third data and the third directory tag indicating ownership of the third data by a second CPU different from the CPU, snoop the second CPU to obtain the third data.

5. The memory system of claim 4, wherein the first cache line and the second cache line each comprise 64 bytes.

6. The memory system of claim 4, wherein the memory controller is part of the CPU.

7. The memory system of claim 4, wherein the volatile memory comprises dynamic random access memory.

8. The memory system of claim 4, wherein the memory controller is further to:
in response to the CPU cache not containing the third data, determine whether the storage class memory contains the third data;
in response to the CPU cache omitting the third data and the storage class memory containing the third data:
process the third data from the storage class memory;
in response to the volatile memory omitting the third directory tag corresponding to the third data, write the third directory tag corresponding to the third data in the volatile memory;
in response to the volatile memory comprising the third directory tag corresponding to the third data and the processing of the third data producing altered data:
write the altered data in the storage class memory; and
replace the third directory tag with a fourth directory tag indicating an altered state.

9. The memory system of claim 8, wherein in response to the volatile memory omitting a directory tag corresponding to the third data and the processing of the third data not altering the third data, writing a directory tag to the volatile memory indicating an unaltered state of the third data in the storage class memory without performing a corresponding write operation in the storage class memory.

10. The memory system of claim 4, wherein the first directory tag and the second directory tag indicate a state of the first data in the storage class memory and the second data in the storage class memory, respectively.

11. The memory system of claim 10, wherein the first directory tag and the second directory tag each comprise two bits.

12. The memory system of claim 10, wherein the first directory tag identifies a particular owner of the first data from amongst a plurality of possible owners.

13. The memory system of claim 4, wherein the storage class memory stores a set of cache lines, each of the cache lines of the set comprising data and a corresponding directory tag identifying ownership of the data and wherein the volatile memory stores a second individual cache line comprising directory tags identifying the ownership of the cache lines of the set stored in the storage class memory.

14. A method comprising:
reading a data cache line;
processing data of the data cache line with a central processing unit (CPU) to alter the data to produce altered data;
writing a data cache line in a storage class memory, the data cache line including the altered data and a directory tag indicating ownership of the altered data;
writing, in a volatile memory, a cache line comprising the directory tag identifying ownership of the data cache line without correspondingly writing the altered data in the volatile memory, wherein the writing of the cache line in the volatile memory further comprises writing a second directory tag identifying ownership of a second data cache line stored in the storage class memory that contains second data, wherein the cache line omits the second data
receiving a request for third data;
determining whether a CPU cache of the CPU contains the third data;
searching the volatile memory for a third directory tag corresponding to the third data, the third directory tag indicating ownership of the third data; and
in response to the CPU cache containing the third data and the third directory tag indicating ownership of the third data by a second CPU different from the CPU, snooping the second CPU to obtain the third data.

15. The method of claim 14 further comprising:
in response to the CPU cache not containing the third data, determining whether the storage class memory contains the third data;
in response to the CPU cache omitting the third data and the storage class memory containing the third data:
processing the third data from the storage class memory;
determining whether the volatile memory contains the third directory tag corresponding to the third data;
in response to the volatile memory comprising the third directory tag corresponding to the third data and the processing of the third data producing second altered data:
writing the second altered data in the storage class memory; and
replacing the third directory tag with a fourth directory tag indicating an altered state.

16. The method of claim 15, wherein the determining of whether the volatile memory contains the third directory tag corresponding to the third data comprises reading the cache line that comprises multiple directory tags, each of the multiple directory tags indicating ownership of different pieces of data.

17. The method of claim 16, wherein the different pieces of data comprise different cache lines of data, wherein each of the multiple directory tags indicates an ownership state of a corresponding one of the cache lines.

* * * * *